United States Patent
Cantrell

(10) Patent No.: US 9,254,815 B1
(45) Date of Patent: Feb. 9, 2016

(54) SYSTEM FOR SECURING A RIDER TO A RECREATIONAL VEHICLE

(71) Applicant: Ryan Cantrell, Dakota City, NE (US)

(72) Inventor: Ryan Cantrell, Dakota City, NE (US)

(*) Notice: Subject to any disclaimer, the term of this patent is extended or adjusted under 35 U.S.C. 154(b) by 0 days.

(21) Appl. No.: 13/958,763

(22) Filed: Aug. 5, 2013

Related U.S. Application Data

(60) Provisional application No. 61/724,341, filed on Nov. 9, 2012.

(51) Int. Cl.
*A47C 31/00* (2006.01)
*B60R 22/00* (2006.01)

(52) U.S. Cl.
CPC .................................. *B60R 22/00* (2013.01)

(58) Field of Classification Search
CPC ............................... B60R 22/105; B60R 22/14
USPC ............. 297/465, 195.1, 466, 195.11, 4, 365; 2/23, 69
See application file for complete search history.

(56) References Cited

U.S. PATENT DOCUMENTS

| | | | |
|---|---|---|---|
| 3,578,383 A | | 5/1971 | Earl |
| 4,177,807 A | | 12/1979 | Ocel |
| 4,799,709 A | * | 1/1989 | Francois ................... 280/801.1 |
| 5,232,267 A | * | 8/1993 | DeMatteo et al. ............ 297/467 |
| 5,423,164 A | * | 6/1995 | Schneider ..................... 54/44.1 |
| 5,494,052 A | * | 2/1996 | Grohman ..................... 128/873 |
| 5,829,840 A | * | 11/1998 | Goeckel ....................... 297/464 |
| 5,890,769 A | * | 4/1999 | Fairbanks ..................... 297/467 |
| 5,901,531 A | * | 5/1999 | Rogers ........................... 54/44.1 |
| 5,954,404 A | | 9/1999 | Suzuki |
| 6,042,189 A | * | 3/2000 | Wellman ....................... 297/465 |
| 6,082,826 A | * | 7/2000 | Moreno ........................ 297/464 |
| 6,669,233 B2 | | 12/2003 | Gabriel |
| 6,676,188 B1 | | 1/2004 | McKinney |
| 6,951,367 B1 | | 10/2005 | Dinnan |
| 7,093,903 B2 | | 8/2006 | O'Connor |
| 2004/0051336 A1 | | 3/2004 | Chiao |
| 2005/0017566 A1 | * | 1/2005 | Rizk ............................. 297/465 |
| 2005/0150030 A1 | * | 7/2005 | Davis ................................. 2/69 |
| 2006/0061186 A1 | | 3/2006 | Funke, III |
| 2007/0261212 A1 | | 11/2007 | Russell |
| 2008/0238174 A1 | | 10/2008 | Cinquanta |
| 2009/0152932 A1 | | 6/2009 | Rothschild |
| 2012/0117705 A1 | * | 5/2012 | Hawkins et al. .................... 2/23 |

* cited by examiner

*Primary Examiner* — Laurie Cranmer
(74) *Attorney, Agent, or Firm* — Jeffrey A. Proehl; Woods, Fuller, Shultz & Smith, P.C.

(57) ABSTRACT

A system for removably securing a person to a recreational vehicle may comprise a vehicle seat having an upper support surface, and a garment configured to be worn by the rider with a torso portion configured to cover at least the lower torso portion and a pair of leg portions configured to cover at least the upper leg portions. The garment may include a crotch section located to be positioned adjacent to the crotch and a portion of the buttocks of the rider. The system may also include a rider attachment structure configured to attach the garment to the vehicle seat in a manner that permits release of the attachment therebetween, and may include a first component and a second component releasably attachable together with the first component being secured to the upper support surface and the second component being secured to the crotch section of the garment.

13 Claims, 2 Drawing Sheets

SYSTEM FOR SECURING A RIDER TO A RECREATIONAL VEHICLE

BACKGROUND

Field

The present disclosure relates to rider restraining systems and more particularly pertains to a new system for securing a rider to a recreational vehicle in a more secure and safer manner.

SUMMARY

In one aspect, the disclosure is directed to a system for removably securing a person to a recreational vehicle. The system may comprise a vehicle seat having an upper support surface for being straddled by a rider of the vehicle. The system may also comprise a garment that is configured to be worn by the rider and including a torso portion configured to cover at least the lower torso portion of the rider and a pair of leg portions configured to cover at least the upper leg portions of the legs of the rider. The garment may include a crotch section located at a lower end of the torso portion in a manner so that the crotch section is positioned adjacent to the crotch and a portion of the buttocks of the rider when the garment is worn. The system may also comprise a rider attachment structure configured to attach the garment to the vehicle seat in a manner that permits release of the attachment therebetween. The rider attachment structure may comprise a first component and a second component releasably attachable together, with the first component being secured to the upper support surface of the seat and the second component being secured to the crotch section of the garment.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
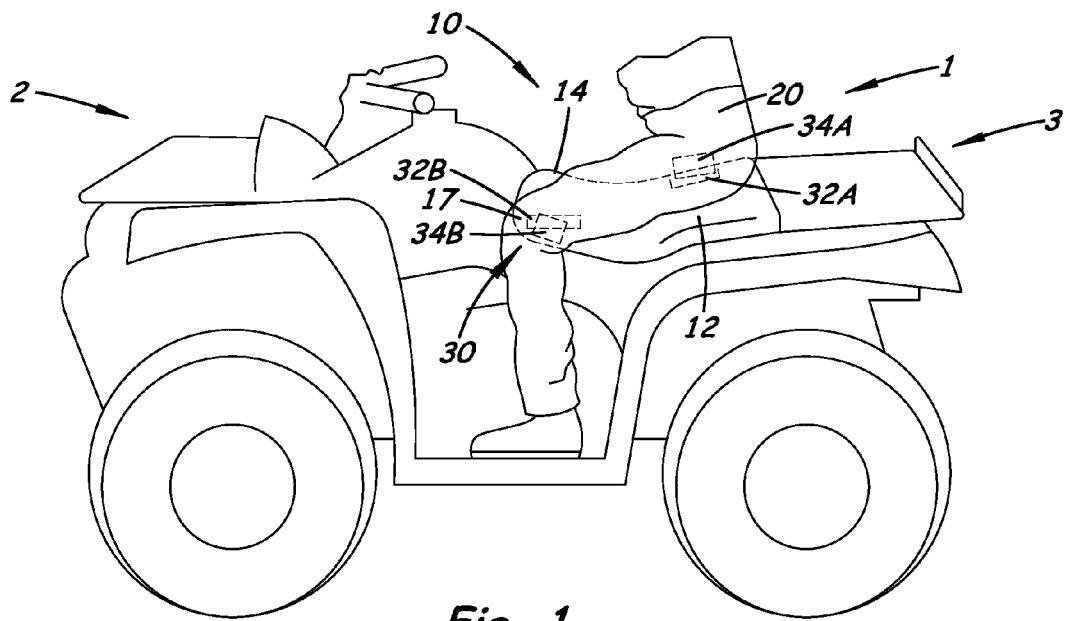
FIG. 1 is a schematic side view of a rider on a recreational vehicle with the new system for securing the rider to the recreational vehicle according to the present disclosure.
Figure 2:
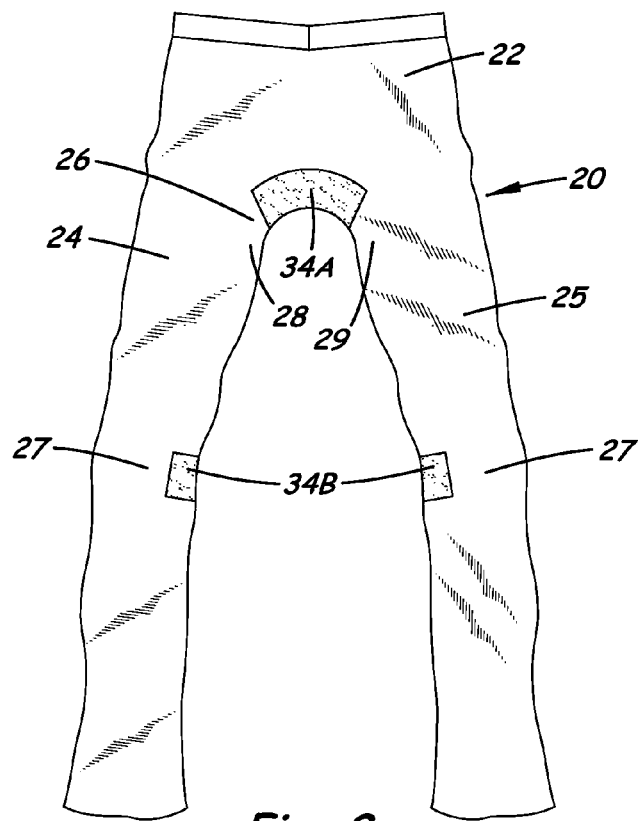
FIG. 2 is a schematic front view of a garment, according to an illustrative embodiment.
Figure 3:
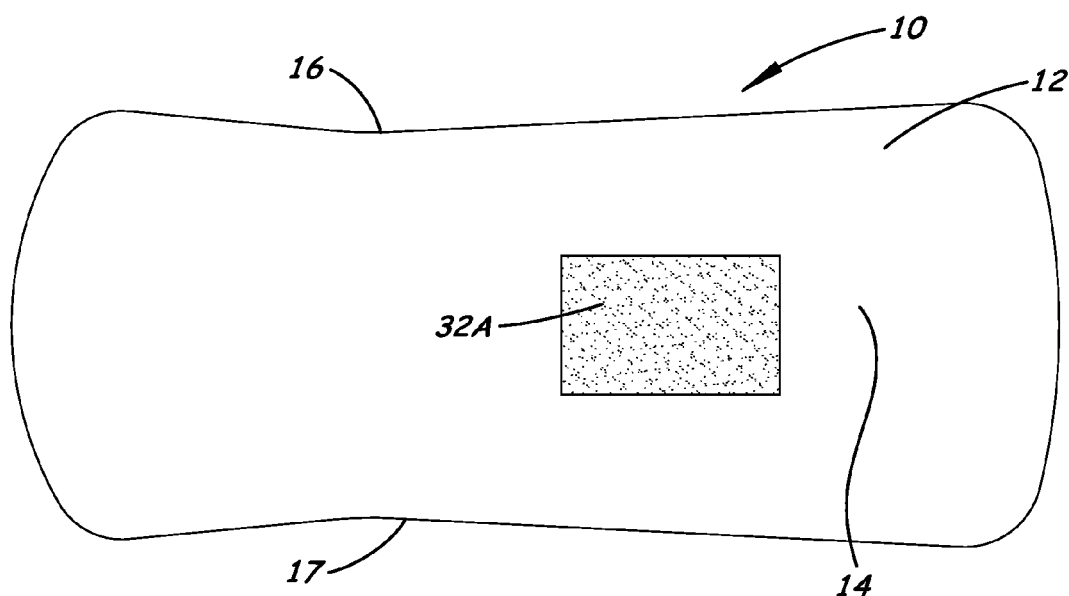
FIG. 3 is a schematic top view of a seat of a recreational vehicle with an illustrative embodiment of the system for securing a rider to a recreational vehicle.
Figure 4:
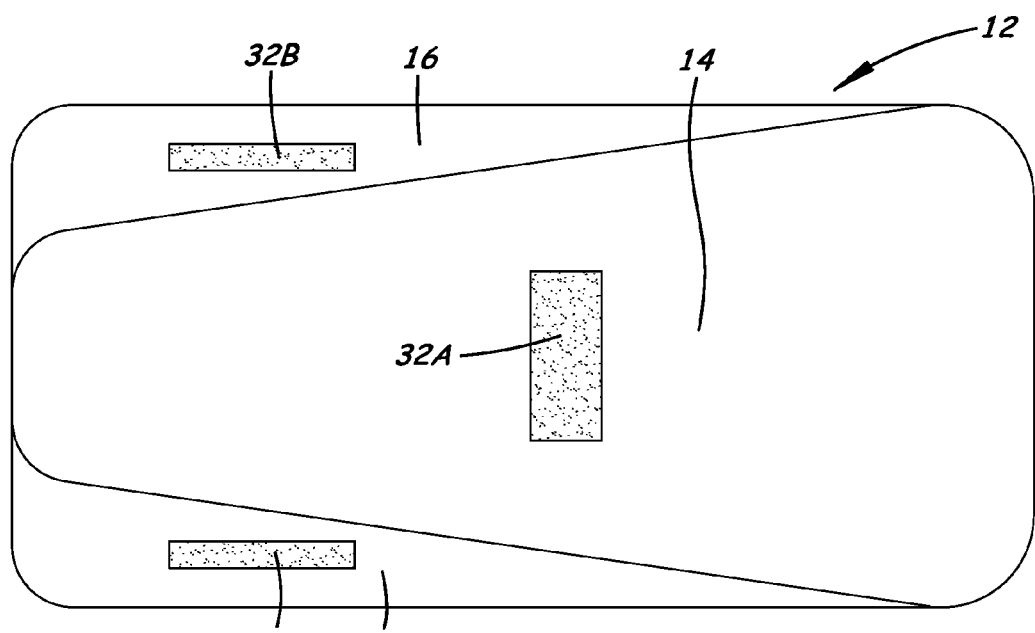
FIG. 4 is a schematic top view of a seat of a recreational vehicle with an illustrative embodiment of the system for securing a rider to a recreational vehicle.

With reference now to the drawings, and in particular to FIGS. 1 through 4 thereof, a new system for securing a rider to a recreational vehicle embodying the principles and concepts of the disclosed subject matter will be described.

The applicant has recognized that persons with a degree of paralysis of their bodies have often been limited from some activities that able bodied people enjoy. Some of the these activities relate to the operation of recreational vehicles, such as, for example, all terrain vehicles, snowmobiles, and even watercraft, and the limitation does not stem from the person's inability to operate the vehicle, but instead from the person's inability to remain comfortably seated on the vehicle when the vehicle and the seat are jostled around by normal vehicle operation (e.g., lateral movement which typically adds to the enjoyment of the activity). Further, if the person is unable to quickly dismount or roll away from the vehicle when the vehicle overturns, or begins to overturn, this can present an additional danger to the rider.

The applicant has thus recognized the need for a means of releasably securing a rider to a recreational vehicle that provides a relatively secure attachment of the rider to the seat of the vehicle while the rider is operating the vehicle, but also allows the rider to relatively easily dismount or roll away from the vehicle in the event of the vehicle overturning.

The applicant has thus developed a system for releasably attaching a rider to e vehicle in a manner that generally may hold the rider in position on the seat against forces and movements that would tend to cause the buttocks of the rider to lift off of the seat of the vehicle, or slide on the surface of the seat and thus shift the position of the rider on the seat. While providing the aforementioned resistance to lifting and sliding, the system may also provide less resistance to the rider rolling or pivoting his or her body away from the seat surface to facilitate the rider quickly dismounting or moving away from the vehicle if the vehicle tips or rolls over onto its side. With this combination, the system is highly suitable, for example, for those riders who may have lost the active use of their legs and are unable to pinch or grip the seat between the their legs, but have the use of the upper extremities to grip and operate the controls and resist tipping of the body during normal vehicle operation.

In one aspect, the disclosure relates to a system 10 for removably securing a person to a recreational vehicle 1, which in general terms may be accomplished by attaching clothing or a garment worn by the person or rider to a rider supporting surface on the vehicle. The vehicle may comprise a three- or four-wheel all terrain vehicle, snowmobile, and the like, although virtually any vehicle may be utilized.

The system 10 may comprise a vehicle seat 12 which may be straddled by a rider when operating the vehicle. The seat 12 may have an upper support surface 14 which may be generally horizontally oriented, but some slanting or sloping of the surface toward the front or toward the rear of the vehicle may be present. Typically, much of the weight of the rider is imposed upon, and thus supported by, the upper support surface. The seat 12 may also include at least one side surface 16 extends downwardly from the upper support surface 14, and in some highly preferred embodiments the seat has a pair of side surfaces 16, 17 that extend downwardly from opposite lateral sides of the upper support surface. The upper support surface 14 may be elongated in a direction extending from a front 2 of the vehicle 1 toward a rear 3 of the vehicle. Typically, although not critically, the surfaces of the seat may be continuous in the character of a vinyl material that produces a slippery surface, or at least a surface that is not very resistant to slippage of clothing resting upon the surfaces 14, 16, 17 of the seat 12.

The system may also include a garment 20 that is configured to be worn by the rider. The garment 20 may be configured to be worn on a lower portion of the torso of the body of the rider, such as the abdomen of the rider, and may also be configured to be worn on the upper portions of legs of the rider, such as the thighs. The garment 20 may include a torso portion 22 that is configured to cover at least the lower torso portion of the rider, and a pair of leg portions 24, 25 configured to cover at least the upper leg portions of the legs of the rider. The garment 20 may include a crotch section 26 that is located at a lower end of the torso portion 22 in a manner so that the crotch section is positioned adjacent to the crotch and a portion of the buttocks of the rider when the garment is worn. The crotch section 26 may thus be positioned between the leg portions 24, 25. The garment 20 may also include a pair of inner leg sections 28, 29, with each inner leg section extending from the crotch section 26 along a respective one of the leg portions in a manner so that the inner leg sections are positioned adjacent to the legs (e.g., inner thighs) of the rider when the garment is worn. The crotch section 26 may be positioned between the pair of inner leg sections 28, 29. In some embodiments, the garment 20 may include a pair of knee portions 27 that are configured to cover areas of the legs of the rider close to the knees of the rider.

The system 10 may also include a rider attachment structure 30 configured to attach the garment to the vehicle seat in a manner that permits release of the attachment therebetween. The rider attachment structure 30 may be characterized by being relatively more resistant to separation caused by upward movement of the garment away from the seat, and may be relatively less resistant to separation caused by peeling or sideways rolling of the garment away from the seat.

In some embodiments, the rider attachment structure 30 may comprise a first component 32 and a second component 34 that are releasably attachable together. The first component 32 may be secured to the seat 12 and the second component 34 may be secured to the garment 20. A first component 32A may be secured to the upper support surface 14 of the seat at a position where the rider is likely to be seated, and more specifically, where the crotch of the rider's garment 20 is likely to be positioned. Optionally, and in some embodiments preferably, another first component 32B may be secured to at least one, and in some embodiments both, of the side surfaces 16, 17 of the seat and may be located where the knee portions 27 of the garment worn by the rider are likely to be rested against the seat surface. The first component(s) 32 may be secured to the seat surfaces by any suitable means, including, for example, adhering, bonding, or stitching. A second component 34A may be secured to the crotch section 26 of the garment, and may also be secured to at least one, and in some embodiments both, of the inner leg sections 28, 29 of the garment, so as to generally align with at least a portion of the first component 32A on the seat. An optional second component 34B may be secured to at least one of the knee portions 27 of the garment to generally align with at least a portion of the first components 32B on the garment worn by the rider.

In some of the most preferred embodiments, the rider attachment structure 30 comprises a hook and loop fastener structure, such as products marketed under the tradename VELCRO. In such embodiments, each of the first 32 and second 34 components comprise one of hook components and the loop components of the hook and loop fastener structure. The hook and loop fastener structure is advantageous for the purposes of the attachment of the disclosure, since the hook and loop components tend to be more difficult to pull apart in a direction that is perpendicular to the support surface of the seat, as this movement tends to require that many or most of the linked hooks and loops be released substantially simultaneously, and thus tends to take more force and effort to accomplish. In contrast, when one of the hook and loop components is instead peeled or rolled away from the other hook and loop component, the removal tends to be easier as the number of hook and loop bonds that need to be released at any one time is reduced. Further, the hook and loop fastener structures are also highly resistant to movement of the hook and loop structures in a parallel directions to the backing panel of the structures.

These characteristics of the hook and loop attachment structure facilitate the resistance of the attachment structure to movement of the rider's garmented body in an upward direction away from the seat, which would require many of the hook and loops to be detached simultaneously, when the vehicle, for example, hits a bump and lurches upward and that back down. Further, the characteristics of the hook and loop attachment structure resists side to side slippage movement of the rider's garmented body that might result from operation of the vehicle through rough terrain and might result in slippage of the rider from the seat. Moreover, the hook and loop fastener structures are less resistant to the peeling away of one component from the other that tends to occur when the rider leans his or her body to one side, such as when seeking to dismount the vehicle or when the vehicle is overturning and the rider needs to fall clear of the vehicle.

It will be recognized that the size and dimensions of the first and second components may be changed or adjusted to adjust the degree or strength of the attachment formed between the first and second components, and as a result between the garment and the seat. Increasing the size of the contact between the first and second components will tend to increase the holding force produced by the components, and thus may be useful when the weight of the rider is relatively higher or the need to exert a greater degree of attachment force is desirable. Conversely, decreasing the size of the contact between the first and second components will tend to decrease the holding force produced by the components. This result may be useful when the weight of the rider is relatively lower or the need to exert a lesser degree of attachment force is desirable.

Further, the size or dimensions of the of the first and second components does not need to be identical, and in some embodiments the size of the first component on the seat may be larger in size than the size of the second component on the garment, which may provide so adjustability in the positioning of the rider on the seat either side to side or front to rear, or both. The first component on the seat may be elongated in a front to rear direction, or in a lateral side to side direction, or both. It is possible that the first component on the seat is relatively large to fit many riders, and the size of the second component on a particular rider's garment is sized to his or her weight and preference for the strength of attachment.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system, comprising:
a motorized recreational vehicle having a vehicle seat with an upper support surface for being straddled by a rider of the vehicle, the upper support surface having a crown at a highest vertical point on the support surface between lateral side surfaces extending downwardly from the crown of the upper support surface, the crown of the upper support surface of the seat being elongated in a direction of travel of the vehicle;
a garment configured to be worn by the rider and including a torso portion configured to cover at least the lower torso portion of the rider and a pair of leg portions configured to cover at least the upper leg portions of the legs of the rider, the garment including a crotch section located at a lower end of the torso portion and between the leg portions such that the crotch section is positioned adjacent to the crotch and a portion of the buttocks of the rider when the garment is worn;
a rider attachment structure configured to attach the garment to the vehicle seat in a manner that permits release of the attachment therebetween, the rider attachment structure comprising a first component and a second component releasably attachable together, the first component being secured to the crown of the upper support surface of the seat and the second component being secured to the crotch section of the torso portion of the garment at a location between the leg portions of the garment such that a weight of the torso of the rider presses the first component on the garment against the second component on the seat.

2. The system of claim 1 wherein the motorized recreational vehicle has wheels driven by a motor.

3. The system of claim 1 wherein the motorized recreational vehicle includes at least one foot rest configured with respect to the seat such that thighs of the rider extend astride side surfaces of the vehicle seat.

4. The system of claim 1 wherein the first component is elongated on the upper seat surface in the direction of travel of the vehicle.

5. The system of claim 1 wherein the first and second components comprise a hook component and a loop component of a hook and loop fastener structure.

6. A system for removably securing a person to a recreational vehicle, the system comprising:
an elongated vehicle seat having an upper support surface for being straddled by a rider of the vehicle, the upper support surface having a crown at a highest vertical point on the support surface between lateral side surfaces extending downwardly from the crown of the upper support surface, the crown of the upper support surface being elongated in a direction of travel for the vehicle;
a garment configured to be worn by the rider and including a torso portion configured to cover at least the lower torso portion of the rider and a pair of leg portions configured to cover at least the upper leg portions of the legs of the rider, the torso portion of the garment is substantially tubular and each of the leg portions is substantially tubular in communication with the torso portion, the garment including a crotch section located at a lower end of the torso portion and between the leg portions such that a vertex of the crotch section is positioned adjacent to the crotch and a portion of the buttocks of the rider when the garment is worn, the garment including a pair of inner leg sections each extending from the crotch section along a respective one of the leg portions in a manner so that the inner leg sections are positioned adjacent to the legs of the rider when the garment is worn;
a rider attachment structure configured to attach the garment to the vehicle seat in a manner that permits release of the attachment therebetween, the rider attachment structure comprising a first component and a second component releasably attachable together, the first and second components including:
an upper said first component secured to the crown of the upper support surface of the seat;
an upper said second component secured to the vertex of the crotch section of the torso portion of the garment at a location between the leg portions of the garment such that a weight of the torso of the rider presses the upper second component on the garment against the upper first component;
a pair of lateral side said first components, each lateral side first components being secured to each of the lateral side surfaces of the seat at a location laterally spaced from the upper first component; and
a pair of lateral side said second components, each lateral side second component being secured to one of the inner leg sections of the garment for removably attaching to the lateral side second component; and
wherein each of the first components and each of the second components comprise either a hook component or a loop component of a hook and loop fastener structure.

7. The system of claim 6 wherein the torso portion of the garment is substantially tubular and each of the leg portions is substantially tubular in communication with the torso portion.

8. A system, comprising:
a motorized recreational vehicle having an elongated vehicle seat with an upper support surface for being straddled by a rider of the vehicle, the upper support surface having a crown at a highest vertical point on the support surface between lateral side surfaces extending downwardly from the crown of the upper support surface, the crown of the upper support surface of the seat being elongated in a direction of travel of the vehicle;
a pair of pants for being worn by the rider, the pants including a torso portion configured to receive at least the lower torso portion of the rider and a pair of leg portions configured to receive at least the upper leg portions of the legs of the rider, the pants including a crotch section located at a lower end of the torso portion and between the leg portions such that the crotch section is positioned adjacent to the crotch and a portion of the buttocks of the rider when the pants are worn by the rider;

a rider attachment structure configured to attach the pants to the vehicle seat in a manner that permits release of the attachment therebetween, the rider attachment structure comprising a first component and a second component releasably attachable together, the first component being secured to the crown of the upper support surface of the seat and the second component being secured to the crotch section of the torso portion of the pants at a location between the leg portions of the pants such that a weight of the torso of the rider presses the first component on the pants against the second component on the seat.

9. The system of claim 8 wherein the motorized recreational vehicle has wheels driven by a motor.

10. The system of claim 8 wherein the motorized recreational vehicle includes at least one foot rest configured with respect to the seat such that thighs of the rider extend astride side surfaces of the vehicle seat.

11. The system of claim 8 wherein the first component is elongated on the upper seat surface in the direction of travel of the vehicle.

12. The system of claim 8 wherein the first and second components comprise a hook component and a loop component of a hook and loop fastener structure.

13. The system of claim 8 wherein the torso portion of the pants is substantially tubular and each of the leg portions of the pants is substantially tubular in communication with the torso portion.

\* \* \* \* \*